Jan. 11, 1944.  H. A. WOOLMAN  2,339,127
TEMPERATURE MEASURING INSTRUMENT
Filed June 7, 1940
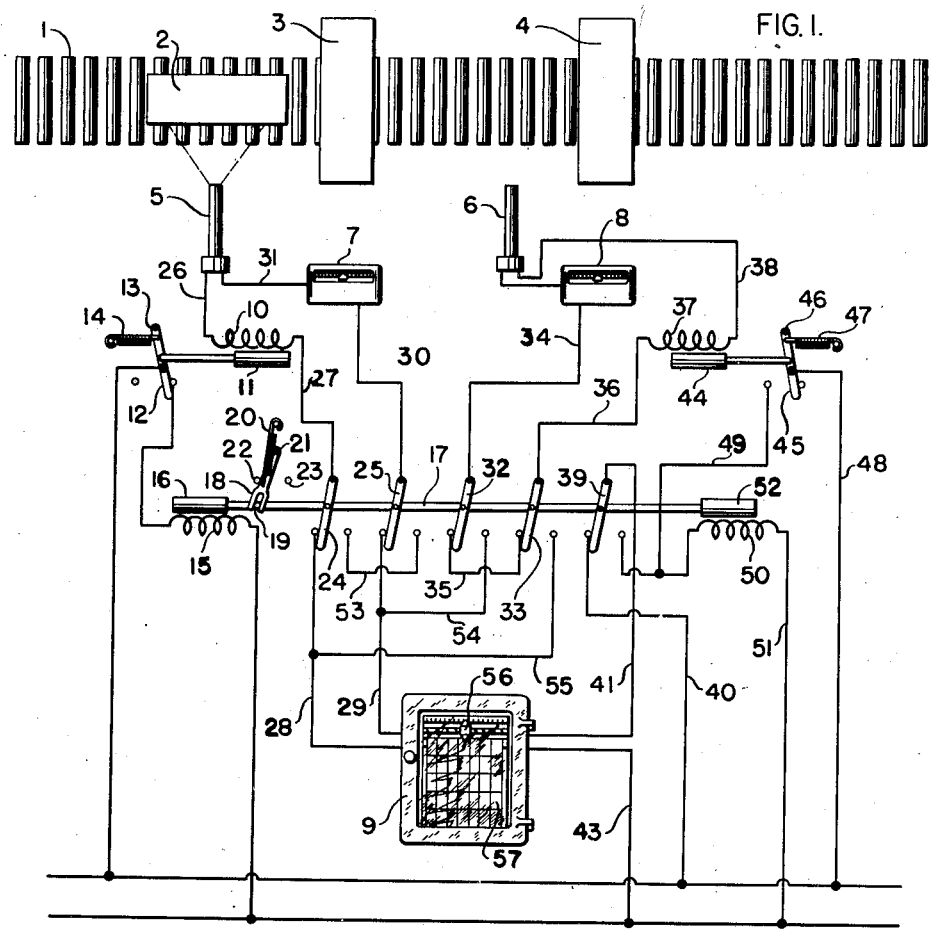
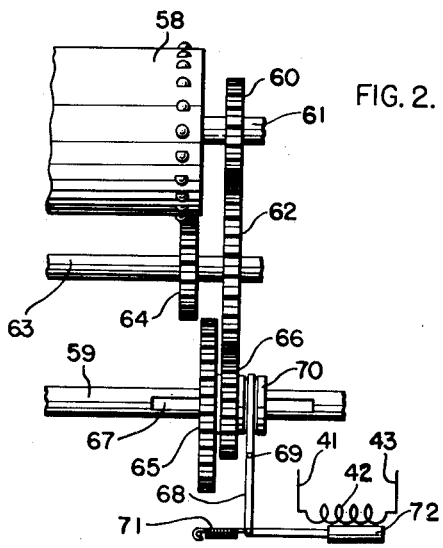
INVENTOR.
HAROLD A. WOOLMAN
BY
ATTORNEY Patented Jan. 11, 1944

2,339,127

UNITED STATES PATENT OFFICE 2,339,127

TEMPERATURE MEASURING INSTRUMENT

Harold A. Woolman, Allegheny County, Pa., assignor to The Brown Instrument Company, Philadelphia, Pa., a corporation of Pennsylvania Application June 7, 1940, Serial No. 339,349

9 Claims. (Cl. 73—342)

The present invention relates to the art of measuring and more particularly to the art of measuring the temperature of a moving object as it passes a plurality of points.

It is often desirable to measure the temperature or other condition of a moving object before and after it has had some operation performed upon it. Prior to this invention it has been necessary to use two measuring and recording instruments or an instrument that made a plurality of records. Each instrument or each record served to give a record of the condition of the object at one of the measuring stations. In order to determine the relative values of the condition of the object at the different points of measurement it was then necessary to compare a plurality of records.

The present invention overcomes the objections of the above mentioned recording systems by making, on a single chart, a continuous record that sequentially shows the value of the condition at the various points of measurement. This is accomplished by providing a responsive element for each of the points at which the condition is to be measured and having a single recording instrument that is sequentially connected to each of the responsive elements. In the present invention the recording instrument is automatically connected to first one and then the next of the responsive elements in response to passage of the object past the responsive element.

It is an object of the present invention to sequentially measure the condition of an object at a plurality of points. It is a further object of the invention to record as a single record the value of a condition of an object as it passes a plurality of points.

The invention is shown and described herein as measuring the temperature of a billet before and after it passes through a set of rolls in a rolling mill. In its broader aspects, however, the invention is applicable to other uses such, for example, as measuring the color of an article before and after it has been subjected to some treatment. The invention should not be limited as to the type of measuring instrument that is used or the article which has its condition measured.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

In the drawing:

Fig. 1 is a wiring diagram showing the measuring system of the invention; and

Fig. 2 is a detail view of the chart drive.

Referring to Figure 1, there is shown a conveyor 1 over which a heated billet is passed as it goes to roll stands 3 and 4 of a rolling mill. It is often desirable to measure the temperature of the billet both before and after it passes through each of the roll stands 3 and 4 in order to get a temperature record thereof, since the temperature of the billet directly affects the characteristics of the finished sheet. Heretofore it has been necessary to measure the temperature of the billet by two different measuring instruments each of which records the temperature on its own chart. By the invention to be described, however, the temperature of the billet is measured at a plurality of points and recorded on the same chart by the same pen. The temperature may be measured by means of measuring systems of the type disclosed in the Nichols Patent 2,241,557 granted May 13, 1941, each of which includes a responsive element 5 or 6 that serves to respond to the temperature of the billet and transmit these responses to an indicatiing instrument 7 or 8, respectively. Each of the responsive elements 5 and 6 may also be individually connected to a recording instrument 9 so that the temperature of the billet to which the elements 5 and 7 are responsive is recorded on the same chart in the instrument 9.

In series with the responsive element 5 is a solenoid 10 which is energized during the time that a billet 2 is passing before the element 5. When it is energized the solenoid 10 moves its core 11 to the right, moving a switch arm 12 around its pivot 13 against the tension of a spring 14 to close a circuit through the solenoid 15. When the solenoid 15 is energized its core 16 is moved to shift a rod 17 and a plurality of switch arms carried thereby to the left. The rod 17 is held in its adjusted position by means of engagement between a yoke 18 and a pin 19. This yoke is held in either of the extreme positions by means of a spring 20 that moves the yoke around its pivot 21 into engagement with either stop 22 or stop 23.

Switch arms 24 and 25 close a series circuit between the element 5, indicating instrument 7 and the recorder 9 through conductors 26 and 27, 28, 29, 30, 31. The switch arms 32 and 33 close a circuit from the responsive element 6 through the indicator 8, conductor 34, switch arm 32, conductor 35, switch arm 33 and conductor 36, solenoid 37 and conductor 38, so that the element 6 will be responsive to the temperature of anything toward which it is directed and this temperature will be indicated on the instrument 8 without any record being made of it. The switch arm 39 serves to close a circuit from one side of the line through conductors 40 and 41, solenoid 42 (Fig. 2) and conductor 43 to the other side of the line. The energization of solenoid 42 serves to speed up the chart in recorder 9 for a purpose and in a manner to be described in detail below.

Unless some heated object is passing in front of the element 6 enough current will not be flowing in the circuit to have an effect on solenoid 37. When, however, the billet 2 passes in front of the element 6 the solenoid 37 will be energized to shift this core 44 to the left and move switch arm 45 around its pivot 46 against the tension of spring 47. This closes a circuit from one side of the line through conductor 48, arm 45, conductor 49, solenoid 50 and conductor 51 to energize the solenoid. Energization of solenoid 50 causes its core 52 to move to the right and move each of the switch arms counterclockwise. Switch arms 24 and 25 thereupon close a circuit directly between the element 5 and the instrument 7 by means of the conductor 53 and simultaneously remove the instrument 9 from that circuit. The switch arms 32 and 33, however, include conductors 54, 29, the instrument 9, conductor 28 and conductor 55 in a circuit so that the instrument 9 is connected to the element 6 and the former will now record the temperature of the billet as responded to by that element. The switch arm 39 when it moves to its right hand position continues to keep solenoid 42 energized through a circuit including conductor 48, arm 45, conductor 49, switch arm 39, conductors 41 and 43. Therefore, the chart of instrument 9 continues to run at its high speed. After the billet 2 is past the element 6 the solenoid 37 will be deenergized and the spring 47 will open switch 45. The consequent deenergizing of the solenoid 42 permits the chart speed to slow down but will not have any affect on the position of rod 17 due to the toggle arrangement afforded by yoke 18 and spring 20.

Since the billets 2 pass at more or less infrequent intervals it is not necessary or desirable for the chart 57 in the instrument 9 to run continuously at a high speed. When a billet passes through the roll stands, however, it is desirable to have the chart 57 move at a high speed so that a detail record of the temperature of the length of the billet may be made thereon by a pen 56. To this end a chart drum 58 located in the instrument 9 serves to move the chart 57, and is driven by means of a drive shaft 59 through gears 60, mounted on the chart drum shaft 61, 62 mounted on a counter shaft 63, which may be driven by gears 64 or 62 that mesh with gears 65 or 66, respectively, keyed to the drive shaft 59 by means of a key 67. The gears 65 and 66 are moved into mesh with gears 64 and 62, respectively, by means of a yoke member 68, pivoted at 69, that has its upper end engaging a collar 70 to which the gears are attached. The yoke is normally held in a position in which gears 66 and 62 are in mesh to provide slow speed drive to the chart drum 58. When, however, the solenoid 42 is energized its core 72 will move to the right against the tension of spring 71 and shift the collar 70 to bring gear 65 into engagement with gear 64, thereby driving the chart drum at high speed. This continues until the solenoid 42 is deenergized, at which time the parts assume the position shown in Figure 2 and the slow speed of the chart drive is resumed.

The operation of the device is as follows. Assuming that the billet 2 has just come under the responsive element 5 the solenoids 10 and 15 will be energized to move the various parts to the position shown in Fig. 1, and the pen 56 will make a record on the chart 57 of the temperature of the billet. After the billet 20 passes through the rolls 3 it will come under the responsive element 6, at which time the solenoids 37 and 50 will be energized to throw the switch rod 17 to the right thereby connecting the element 6 with the recorder 9. The element 6 will then be responsive to temperature of the billet 2, which temperature will be recorded on the chart 57. This measurement continues and a record thereof is made on chart 57 by pen 56 until the billet passes to the right of the responsive element 6. At this time the solenoid 37 becomes deenergized to permit switch 45 to open and break the circuit through solenoid 42. Spring 71 will then reengage gears 62 and 66 so that the chart may run at a slow speed until another billet comes under responsive element 5 at which time the cycle will be repeated. By means of this apparatus it will, therefore, be seen that the same pen records on the same chart the temperature of the billet that is measured in sequence by two different responsive elements. The record made on the chart 57 is a record of the rate of temperature change of the billet 1. This is true because as the temperature of the billet falls during its passage through a roll stand this temperature change is plotted on a chart against time. The time temperature record is an indication of rate.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent, is:

1. In a measuring instrument, means to record the value of a condition of an object as it moves along a path, a first responsive device located adjacent one portion of said path to respond to the value of the condition as the object passes by said device, a second responsive device located adjacent a second portion of said path to respond to the value of said condition as the object passes by said second device, and means operated by said responsive devices to connect sequentially said recording means to the said devices.

2. In a measuring instrument, means to record the value of a condition of an article at various points in a path of travel, a plurality of condition responsive devices spaced along said path of travel at said points and means operated by said responsive devices as an article passes each device to connect said device to said recording means.

3. A measuring system comprising a recording instrument having a chart, means to drive the chart at a plurality of speeds, a plurality of responsive devices adapted to respond to the value of a condition of an article before and after an operation has been performed upon it, means to successively connect said devices to said instrument whereby the latter may record the responses made thereby and means to change the speed of said chart driving means during the time a record is made of the condition as responded to by said devices.

4. Apparatus for measuring a variable condition of an object at a plurality of points comprising a plurality of responsive devices located so that they will be acted upon at the points at which it is desired to measure said condition, a recording instrument, and means to successively connect said devices to said instrument in response to the action of said condition on said devices.

5. Apparatus for recording the value of a condition of an object at a plurality of points comprising a single recording element, and a responsive device at each point at which it is desired to have a record of said condition, a first circuit connecting one of said devices and said element, a second circuit connecting another of said devices and said element, means to simultaneously break one of said circuits and make the other, and means operated in response to an action made on said devices by said condition to operate said first means.

6. In a recording system, a recording instrument, a first responsive device, a second responsive device, a switch connected to said devices and adapted to connect one or the other of said devices to said recording instrument, means operated by the responses made by said first device to operate said switch to connect it to said recording instrument and means operated by the responses made by said second device to operate said switch to connect it to said recording instrument.

7. In a measuring system the combination of a recording instrument, a first responsive device and an indicating device connected therewith, a second responsive device and an indicating device connected therewith, switch means to connect one or the other of said responsive and indicating devices to said recording instrument, relay means to operate said switch in opposite directions and means responsive to the action of said responsive devices to operate said relay means.

8. In a measuring system, the combination of means to sequentially measure and record the value of the temperature of a moving object before and after an operation has been performed on it including a recording instrument, a first responsive device located in a position to respond to the temperature of said object before the operation is performed, means operated by said device in response to the passage of said object past said device to connect said recording instrument to said device, a second responsive device located in a position to respond to the temperature of said object after the operation is performed, said responsive devices being so located that the object is out of range of the first device before it comes in range of said second device, and means operative in response to passage of said object past said second device to disconnect said first device from said recording instrument and to connect said second device thereto.

9. In a measuring system, the combination of means to sequentially record the value of a condition of a measuring object before and after an operation has been performed on it including a recording instrument having a chart upon which the record is to be made, a two-speed drive for said chart, the chart normally running at one speed, a first responsive device located to respond to the value of said condition prior to the time the operation is performed on the object, a second responsive device located to respond to the value of the condition after the operation has been performed on the object, said responsive devices being so located relative to each other that the object is completely past the first device before it reaches the second, means responsive to passage of the object past the first device to connect said recording instrument to said device and operative to change the speed of said chart drive, means operative in response to passage of said object past said second device to disconnect said recording instrument from said first device and to connect it to said second, and means to return said chart speed to its normal value upon completion of the passage of said article past said second device.

HAROLD A. WOOLMAN.